J. ENHELDER.
BEE FEEDER.
APPLICATION FILED OCT. 3, 1911.
1,056,783.
Patented Mar. 25, 1913.
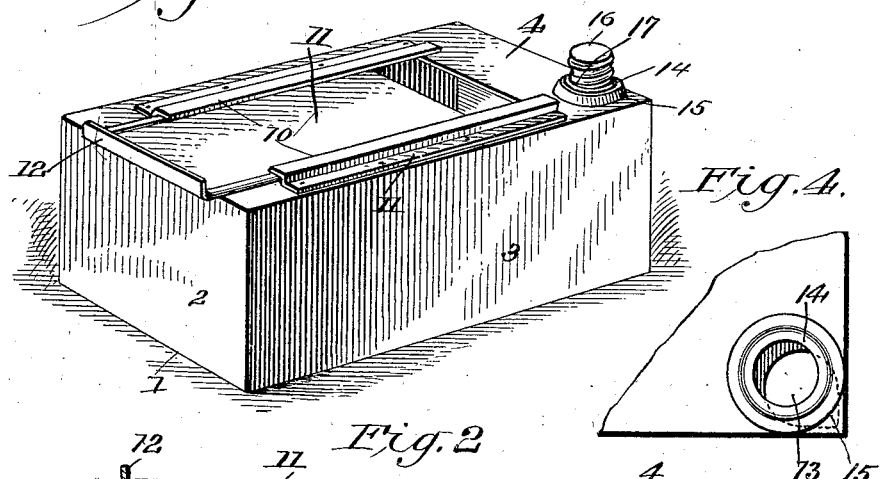
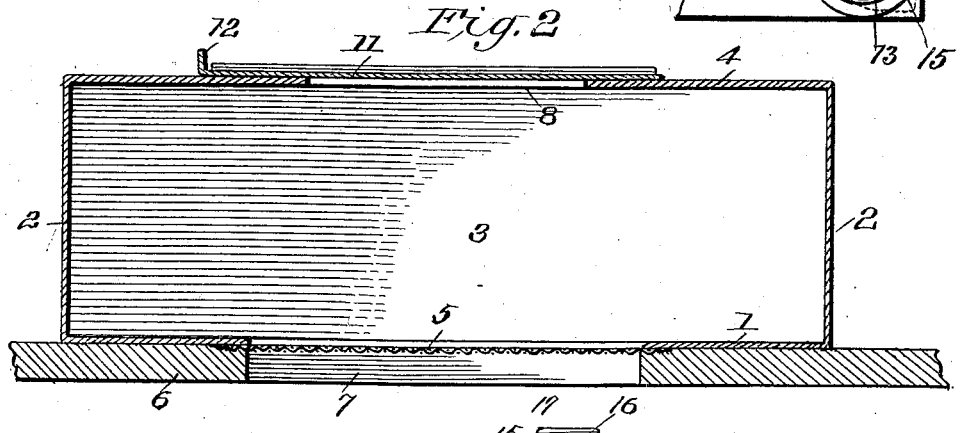
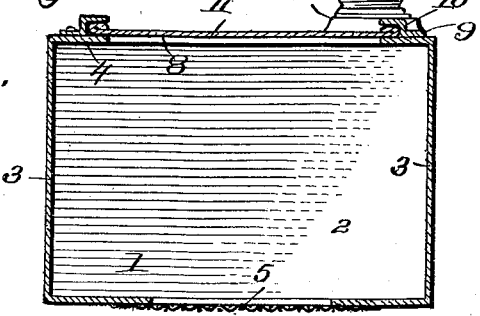
Witnesses
Inventor
Jessie Enhelder
By
A. W. Stacey
Attorney.

UNITED STATES PATENT OFFICE.

JESSIE ENHELDER, OF GREENWOOD, WISCONSIN.

BEE-FEEDER.

1,056,783. Specification of Letters Patent. Patented Mar. 25, 1913.

Application filed October 3, 1911. Serial No. 652,616.

*To all whom it may concern:*

Be it known that I, JESSIE ENHELDER, a citizen of the United States, residing at Greenwood, in the county of Clark and State of Wisconsin, have invented certain new and useful Improvements in Bee-Feeders, of which the following is a specification.

This invention relates to bee feeders and aims primarily to provide a device for feeding bees, which device may be readily assembled with an ordinary bee-hive and may be conveniently supplied with sugar, or the like, upon which the bees are to be fed.

The invention further aims to provide a device of this class from which surplus water may be drained without losing any of the sugar or other solid substance which the water is intended to moisten.

The invention further contemplates the provision of a bee-feeder so constructed that the sugar or other substance upon which the bee is to be fed will not be too freely delivered to the bees so that not only is waste prevented, but the substance used as feed is prevented from falling into the hive.

For a full understanding of the invention reference is to be had to the following description and accompanying drawing, in which:—

Figure 1 is a perspective view of the bee feeder embodying the present invention. Fig. 2 is a vertical sectional view therethrough. Fig. 3 is a vertical transverse sectional view. Fig. 4 is a top plan view of one corner of the feeder with the closure cap for the drain spout removed.

Corresponding and like parts are referred to in the following description and indicated in all the views of the accompanying drawing by the same reference characters.

In the drawing the feeder embodying the present invention is illustrated as in the form of a box which is preferably constructed of sheet metal, although it may be made from wood, paper, or any other suitable material and the bottom of this box is indicated by the numeral 1, and its end walls being indicated by the numeral 2 and its side walls by the numeral 3. The top of the box is indicated at 4 and is constructed for the introduction of sugar or other material employed in feeding the bees, into the box, as will be presently explained.

A screen or foraminous plate 5 is arranged in the bottom 1 of the box and the openings of this screen or plate are preferably only sufficiently large to permit of the insertion of the proboscides of the bees when feeding upon the material contained within the box, and are therefore sufficiently small to prevent grains of sugar falling therethrough and into the hive. The box is disposed upon the top of a hive, a portion of the top being shown in Fig. 2 of the drawing and being indicated by the numeral 6 and formed with an opening 7 above which the screen or foraminous blade 5 extends.

In its top 4, the feed-box is formed with an opening 8 and upon the upper side of the said top of the box, at opposite sides of the opening 8 therein, there are secured slides 9 in which are slidably fitted the lateral edges 10 of a closure plate 11, designed when in position upon the top, to close the opening 8 therein. This closure plate 11 is provided at one end with an upstanding flange 12 which may be grasped for the purpose of sliding the closure plate to open position. When the plate has been slid to open position, a quantity of sugar or other substance to be used in feeding the bees is placed in the box through the said opening 8 therein and when the box has been sufficiently filled, the closure plate is slid to closed position, thereby closing the box except for the openings of the screen in its bottom.

In the use of the sugar or a similar solid substance for feeding the bees it is customary to moisten the same with water or some other liquid, and it not infrequently happens, particularly, where sugar is used, that the solid material will deliquesce, resulting in an increase of the liquid substance within the box. To prevent the liquid contents of the box dripping down through the screen into the hive, it is expedient that means be provided whereby the box may be drained at suitable intervals. To this end, the box is formed in its top wall 4, at one corner, with an opening 13, and a spout 14 is secured upon the said top and has a relatively wide base portion 15 and a threaded neck 16 upon which is removably fitted a closure cap 17 as shown in Fig. 3 of the drawing. By referring to Fig. 4 of the drawing, it will be observed that the opening 13 is offset with respect to the neck of the spout, in the direction of that corner of the top 4 at which the opening and spout are located. When it is desired to drain the surplus liquid contents of the box, the box is removed from the top of the hive and the cap 17 is removed. The box is then disposed with its corner at which the drain opening 13 is formed, lowermost, and the liquid allowed to flow out through the spout. It will be readily understood that by providing a drain spout such as is described and locating the same at one corner of the box, the surplus liquid will be more completely drained from the box than would be possible by partly opening the closure 11, and it will further be understood that by offsetting the opening 13 in the direction of that corner of the box at which it is located, a more complete draining of the surplus liquid from the box is provided for.

Having thus described the invention what is claimed as new is:—

A bee feeder including a container having a top, the said top being provided at one corner with a drain opening, a spout having a base or body secured to the top of the container at the said corner thereof and surrounding the opening, the opening being offset with respect to the neck of the spout in the direction of the corner of the top at which the spout is located, and a closure for the spout.

In testimony whereof I affix my signature in presence of two witnesses.

JESSIE ENHELDER. [L. S.]

Witnesses:
 CARL STANGE,
 HERMAN NORTH.